United States Patent
Hiramatsu et al.

(10) Patent No.: US 7,392,019 B2
(45) Date of Patent: *Jun. 24, 2008

(54) WIRELESS BASE STATION APPARATUS AND WIRELESS COMMUNICATION METHOD

(75) Inventors: Katsuhiko Hiramatsu, Yokosuka (JP); Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 541 days.

This patent is subject to a terminal disclaimer.

(21) Appl. No.: 11/053,837

(22) Filed: Feb. 10, 2005

(65) Prior Publication Data

US 2005/0148369 A1 Jul. 7, 2005

Related U.S. Application Data

(63) Continuation of application No. 10/181,976, filed on Jul. 24, 2002, now Pat. No. 6,876,870.

(30) Foreign Application Priority Data

Dec. 21, 2000 (JP) .............................. 2000/389473
Dec. 19, 2001 (WO) ........................ PCT/JP01/11118

(51) Int. Cl.
*H04B 1/02* (2006.01)
*H04B 17/00* (2006.01)
*H04M 1/00* (2006.01)

(52) U.S. Cl. .................... 455/101; 455/103; 455/115.1; 455/562.1

(58) Field of Classification Search ................. 455/101, 455/91, 103, 115.1, 121, 123, 511, 515, 562.1, 455/575.7, 114.2, 561
See application file for complete search history.

(56) References Cited

U.S. PATENT DOCUMENTS

| 6,038,263 | A  |   | 3/2000  | Kotzin |
|-----------|----|---|---------|--------|
| 6,141,335 | A  |   | 10/2000 | Kuwahara |
| 6,173,005 | B1 | * | 1/2001  | Kotzin et al. ................. 375/141 |
| 6,226,508 | B1 |   | 5/2001  | Takahashi et al. |
| 6,442,405 | B1 |   | 8/2002  | Hiramatsu et al. |
| 6,477,213 | B1 |   | 11/2002 | Miyoshi et al. |
| 6,556,845 | B1 |   | 4/2003  | Ide et al. |
| 6,600,933 | B1 |   | 7/2003  | Hiramatsu et al. |
| 6,690,712 | B2 |   | 2/2004  | Kim et al. |

(Continued)

FOREIGN PATENT DOCUMENTS

EP          0926843          6/1999

(Continued)

OTHER PUBLICATIONS

International Search Report dated Apr. 2, 2002.

(Continued)

*Primary Examiner*—Sonny Trinh
(74) *Attorney, Agent, or Firm*—Dickinson Wright, PLLC

(57) ABSTRACT

Transmission diversity and adaptive array antenna transmission is executed with respect to a user to which a shared channel is assigned, or a pilot channel is shared a like a shared channel. By this means it is made possible to secure a large number of users without code resource shortages even where adaptive array antenna is applied to a shared channel.

8 Claims, 7 Drawing Sheets

U.S. PATENT DOCUMENTS

| | | |
|---|---|---|
| 6,721,367 B1 | 4/2004 | Miya et al. |
| 6,738,646 B2 | 5/2004 | Miyoshi et al. |
| 6,748,024 B2 * | 6/2004 | Kuchi et al. ............... 375/299 |
| 6,771,984 B1 | 8/2004 | Hiramatsu et al. |
| 6,788,737 B1 | 9/2004 | Miyoshi et al. |
| 6,876,870 B2 * | 4/2005 | Hiramatsu et al. ....... 455/562.1 |
| 7,230,975 B2 * | 6/2007 | Subrahmanya et al. ...... 375/148 |
| 2002/0044591 A1 | 4/2002 | Lee et al. |
| 2002/0131381 A1 | 9/2002 | Kim et al. |
| 2002/0141362 A1 | 10/2002 | Hsu et al. |
| 2003/0142755 A1 * | 7/2003 | Chi et al. ................... 375/265 |
| 2006/0073797 A1 * | 4/2006 | Kent et al. ................. 455/132 |
| 2006/0183439 A1 * | 8/2006 | Erceg ......................... 455/101 |
| 2006/0209883 A1 * | 9/2006 | Suzuki ....................... 370/465 |

FOREIGN PATENT DOCUMENTS

| | | |
|---|---|---|
| EP | 1033819 | 9/2000 |
| EP | 1204282 | 5/2002 |
| JP | 08274687 | 10/1996 |
| JP | 10313472 | 11/1998 |
| JP | 2000 286779 | 10/2000 |
| KR | 1999 0088235 | 12/1999 |
| WO | 9959263 | 11/1999 |
| WO | 0074292 | 12/2000 |
| WO | 0215504 | 2/2002 |

OTHER PUBLICATIONS

3G TS 25.211, V3.3.0, Jun. 2000, 3rd Generation Partnership Project; Technical Specification Group Radio Access Network; Physical channels and mapping of transport channels onto physical channels (FDD), Release 1999, pp. 1-42.

3G TS 25.214 V3.3.0, Jun. 2000, 3rd Generation Partnership Project; Technical Specification Group Radio Access Network; Physical layer procedures (FDD), Release 1999, pp. 1-44.

Japanese Office Action dated Oct. 19, 2004 with English translation.

3G TS 25.211, V3.0.0, Oct. 1999, 3rd Generation Partnership Project; Technical Specification Group Radio Access Network; Physical Channels and Mapping of Transport Channels onto Physical Channels (FDD), Release 1999, 3GPP Organizational Partners, Valbonne, France, www.3gpp.org, pp. 1-35.

3G TS 25.214 V3.0.0, Oct. 1999, 3rd Generation Partnership Project (3GPP); Technical Specification Group Radio Access Network; Physical Layer Procedures (FDD), Release 1999, 3GPP Organizational Partners, Valbonne, France, www.3gpp.org, pp. 1-39.

Korean Office Action dated May 26, 2005 with English translation.

Partial European Search Report dated May 31, 2005.

European Search Report dated Jul. 28, 2005.

"Universal Mobile Telecommunications System (UMTS); Physical Channels and Mapping of Transport Channels onto Physical Channels (FDD)(3G TS 25.211 ver. 3.1.1 Release 1999)," Technical Specification, ETSI TS 125 211 v3.1.1, XP002151815, www.etsi.org, Valbonne, France, pp. 1-38, Nov. 2, 2000.

B. Raghothaman, et al., "Transmit Adaptive Array without User-Specific Pilot for 3G CDMA," Nokia Research Center, Acoustics, Speech, and Signal Processing, Piscataway, NJ, IEEE, vol. 5, XP010506641, pp. 3009-3019, Jun. 5, 2000.

* cited by examiner

WIRELESS BASE STATION APPARATUS AND WIRELESS COMMUNICATION METHOD

This is a continuation of application Ser. No. 10/181,976 filed Jul. 24, 2002 now U.S. Pat. No. 6,876,870.

TECHNICAL FIELD

The present invention relates to digital wireless communication systems, and more particularly, to wireless base station apparatus and wireless communication methods for use with CDMA (Code Division Multiple Access).

BACKGROUND ART

In digital wireless communication systems, adaptive array antenna (hereinafter "AAA") techniques are used to adaptively control directivity by multiplying weight to an antenna output from a plurality of antenna elements. AAA techniques utilize a direction of arrival of a signal is different from one another and suppress interference signals by adaptively controlling directivity. For this reason, adaptive array antenna techniques are suitable for removing interference signal on a single channel.

In digital wireless communication, there are cases where AAA transmission is performed using the weight used upon AAA reception. In terms of AAA transmission, there is also a method whereby a direction of arrival is estimated in respect to a signal from a user and the weight is calculated so as to turn the directivity in this direction, and AAA transmission is performed using the calculated weight.

Upon performing AAA transmission, channel estimation takes place using the reference signals transmitted by directivity transmission. In this context, an individual pilot channel S-CPICH (Secondary-Common Pilot Indicator CHannel) signal is used per user as a reference signal.

In order to transmit large-volume packet data on downlink channels, the implementation of shared channels such as the DSCH (Downlink Shared Channel) whereby a plurality of communication terminals (users) use one channel has come under consideration in recent years. For instance, when performing transmission using the DSCH, each user uses its dedicated channel to transmit control data to control transmit power and maintain synchronization, while receiving information as to whether the transmitted DSCH signal addresses the user as well as information on the transmission rate of DSCH.

Furthermore, a communication terminal receives dedicated channels and makes decisions as to whether these channels address the terminal apparatus, and, when they do, interprets the information regarding the transmission rate of DSCH from the dedicated channels and receives and demodulates the signals transmitted by DSCH.

Where transmission diversity of CDMA/FDD (Frequency Division Duplex) of 3GPP (3rd Generation Partnership Project) is employed, that is, where transmission diversity and AAA transmission are applied to DSCH, CPICH is transmitted from two pairs of array antennas by means of AAA, which necessitates CIPCHs by double the number of users. As a result, code resources run short and the number of users is limited.

DISCLOSURE OF INVENTION

The present invention aims to provide a wireless base station apparatus and wireless communication methods whereby such wireless communication that secures a large number of users without code resource shortages can be performed where adaptive array antenna transmission is applied to shared channels.

When shared channels such as DSCH are transmitted by means of combining AAA transmission and transmission diversity, pilot channels used as reference signals need to be sent by AAA transmission to calculate feedback information for the transmission diversity in communication terminals. As a result, the number of spreading codes used for these pilot channels grows. Focusing on this point, the present inventors have arrived at the present invention upon discovering that code resource shortages due to the growth of pilot channels in number can be avoided by sharing pilot channels and by switching the directivity of the pilot channels according to the switching of the shared channel.

Furthermore, since DSCH transmits control data except data, each user uses its dedicated channel to transmit control data and control transmit power and maintain synchronization. When transmission diversity is performed in this context, the dedicated channels appended to DSCH become necessary corresponding to the number of diversity antennas (normally two). Because of this, the number of spreading codes used for dedicated channels grows.

Furthermore, one major aspect of these dedicated channels is the transmission of control data, and so the transmission rates are low. This makes it possible to perform communication using low spreading factors, and the use of transmission diversity or AAA transmission is of minor merit.

Focusing on this point, the present inventors have arrived at the present invention upon discovering that by using AAA transmission and transmission diversity to both DSCH and the dedicated channel appended thereto of a user to which DSCH signal is transmitted, and by not using transmission diversity on the dedicated channel that is appended to DSCH with regard to a user DSCH signal is not transmitted to, it becomes unnecessary to assign pilot channels for transmission diversity to users to which DSCH signal is not transmitted, and code resource shortages resulting from the growth of pilot channels in number can be avoided.

In short, the above object can be achieved by such means as performing transmission by combining transmission diversity and adaptive array antenna transmission in respect to users to which a shared channel is assigned or by sharing pilot channels like shared channels.

BEST MODE FOR CARRYING OUT THE INVENTION

Now with reference to the accompanying drawings, embodiments of the present invention will be described.

EMBODIMENT 1

A case will be described here with the present embodiment where AAA transmission and transmission diversity are applied to a shared channel to perform transmission.

Figure 1:
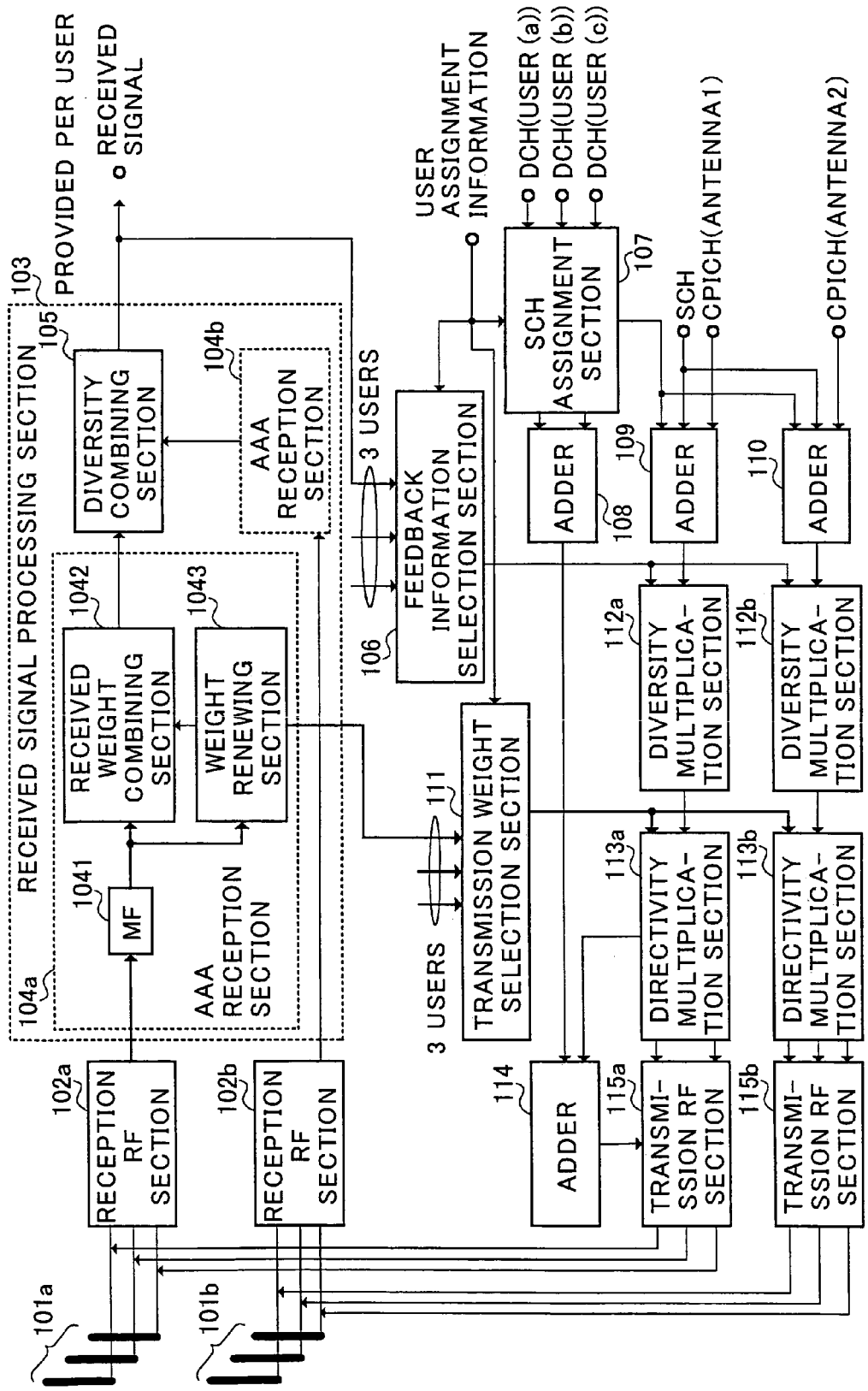
FIG. 1 is a block diagram showing a configuration of a wireless base station apparatus according to Embodiment 1 of the present invention.

FIG. 1 is a block diagram showing a configuration of a wireless base station apparatus according to Embodiment 1 of the present invention. The bold lines in FIG. 1 denote information for 3 antenna elements.

A case will be described here with FIG. 1 where 3 antenna elements constitute an array antenna and diversity is performed by 2 array antennas. However, the present invention is not limited to such case and is applicable to cases where an array antenna comprises any number of antenna elements other than 3. Also, the present embodiment describes a case with 3 users, yet the present invention can similarly be applied to cases with 2 users or 4 or more users. The present embodiment furthermore describes a case where DSCH is used as a shared channel (SCH) and S-CPIH as a common pilot channel (CPICH).

An uplink channel signal (received signal) from a communication terminal apparatus is received in reception RF section 102a via array antenna 110a which is antenna 1. In reception RF section 102a the received signal is subjected to predetermined wireless reception processing (i.e., down-conversion, amplification, A/D conversion, etc.), and the signal after the wireless reception processing is output to received signal processing section 103.

Also, a received signal is received in reception RF section 102b via antenna 110b which is antenna 2. In reception RF section 102b the received signal is subjected to predetermined wireless reception processing, and the signal after the wireless reception processing is output to received signal processing section 103.

Received signal processing section 103 is provided per user, and each one comprises AAA reception section 104a and 104b, and diversity combining section 105. Furthermore, AAA reception section 104a and 104b each comprises matched filter (MF) 1041, received weight combining section 1042, and weight renewing section 1043. Since the operations of AAA reception section 104a and 104b are the same, AAA reception section 104a will be used here for description.

The signal output from reception RF section 102a is subjected to correlation calculation in MF 1041 in AAA reception section 104a using the spreading code used by the communication terminal. The output of this correlation calculation is sent to received weight combining section 1042 and to weight renewing section 1043.

In weight renewing section 1043, a direction of arrival of the received signal is estimated, and the received weight is calculated based on the result of this arrival direction estimation. The received weight is then output to received weight combining section 1042. The received weight is also output from weight renewing section 1043 to transmission weight selection section 111 for use as a transmission weight in transmission weight selection section 111.

In received weight combining section 1042, AAA reception processing upon the correlation output from MF 1041 takes place using the received weight obtained in weight renewing section 1043, and the signal after the AAA reception processing is output to diversity combining section 105.

In diversity combining section 105, signals after the AAA reception processing from all AAA reception sections 104a and 104b are combined to obtain a received signal. Incidentally, when the current user is assigned to DSCH, received signals from this user contain feedback information (phase difference information or phase difference/amplitude information) for transmission diversity, and so this feedback information is then output to feedback information selection section 106.

SCH assignment section 107 selects a user's dedicated channel that is to be transmitted by DSCH, based on user assignment information. Since transmission diversity and AAA transmission are applied to the transmission data (e.g., destination and transmission rate) of the user's dedicated channel transmitted by DSCH along with DSCH and S-CPICH, the transmission data of the DSCH-transmitted user's dedicated channel is multiplexed with DSCH and S-CPIH in adder 109 for antenna 101a and in adder 110 for antenna 101b respectively and then output to diversity multiplication section 112a and 112b.

User assignment information is also output to feedback information selection section 106, where the DSCH-transmitted user's feedback information is selected. In feedback information selection section 106, then, a weight for transmission diversity is calculated based on the selected feedback information. For instance, a weight such as one that fixes a basis with one antenna while giving another antenna a phase difference is calculated based on phase difference information which is feedback information. This transmission diversity weight is output to diversity multiplication section 112a and 112b.

In diversity multiplication section 112a and 112b, the signal in which an dedicated channel, DSCH, and S-CPIH are multiplexed is multiplied by a weight of the feedback information selected in feedback information selection section 106, and the signal after the multiplication is respectively output to directivity multiplication section 113a and 113b.

Since user assignment information is output also to transmission weight selection section 111, weight selection section 111 selects a transmission weight for user to receive DSCH-transmitted signals. The selected transmission weight is output to directivity multiplication section 113a and 113b.

In directivity multiplication section 113a and 113b, outputs from diversity multiplication sections 112a and 112b are multiplied by the transmission weight selected in transmission weight selection section 111, and the signal after the multiplication is output to transmission RF section 115a and 115b respectively. Outputs for one antenna element of antenna 101a are sent to adder 114.

Meanwhile transmission data (destination, transmission rate) of user dedicated channels that are not transmitted by DSCH are multiplexed in adder 108 and output to adder 114. In adder 114, the output from directivity multiplication section 113a and transmission data of the user dedicated channels that are not transmitted by DSCH are multiplexed and output to transmission RF section 115a.

In transmission RF section 115a, outputs from directivity multiplication section 113a and 113b and from adder 114 are subjected to predetermined wireless transmission processing (D/A conversion, amplification, up-conversion, etc.). The signal after the wireless transmission processing is transmitted as a downlink channel signal via antenna 101a to communication terminal apparatus. In transmission RF section 115b, outputs from directivity multiplication section 113a and 113b are subjected to predetermined wireless processing. The signal after the wireless transmission processing is transmitted as a downlink channel signal via antenna 101a to communication terminal apparatus.

At this point, the DSCH-transmitted user's dedicated channel, DSCH, and S-CPIH are transmitted from antenna 101a and from 101b with transmission diversity and AAA transmission applied, and the transmission of user dedicated channels that are not transmitted by DSCH dedicated channel is performed by one antenna element of antenna 101b.

Figure 2:
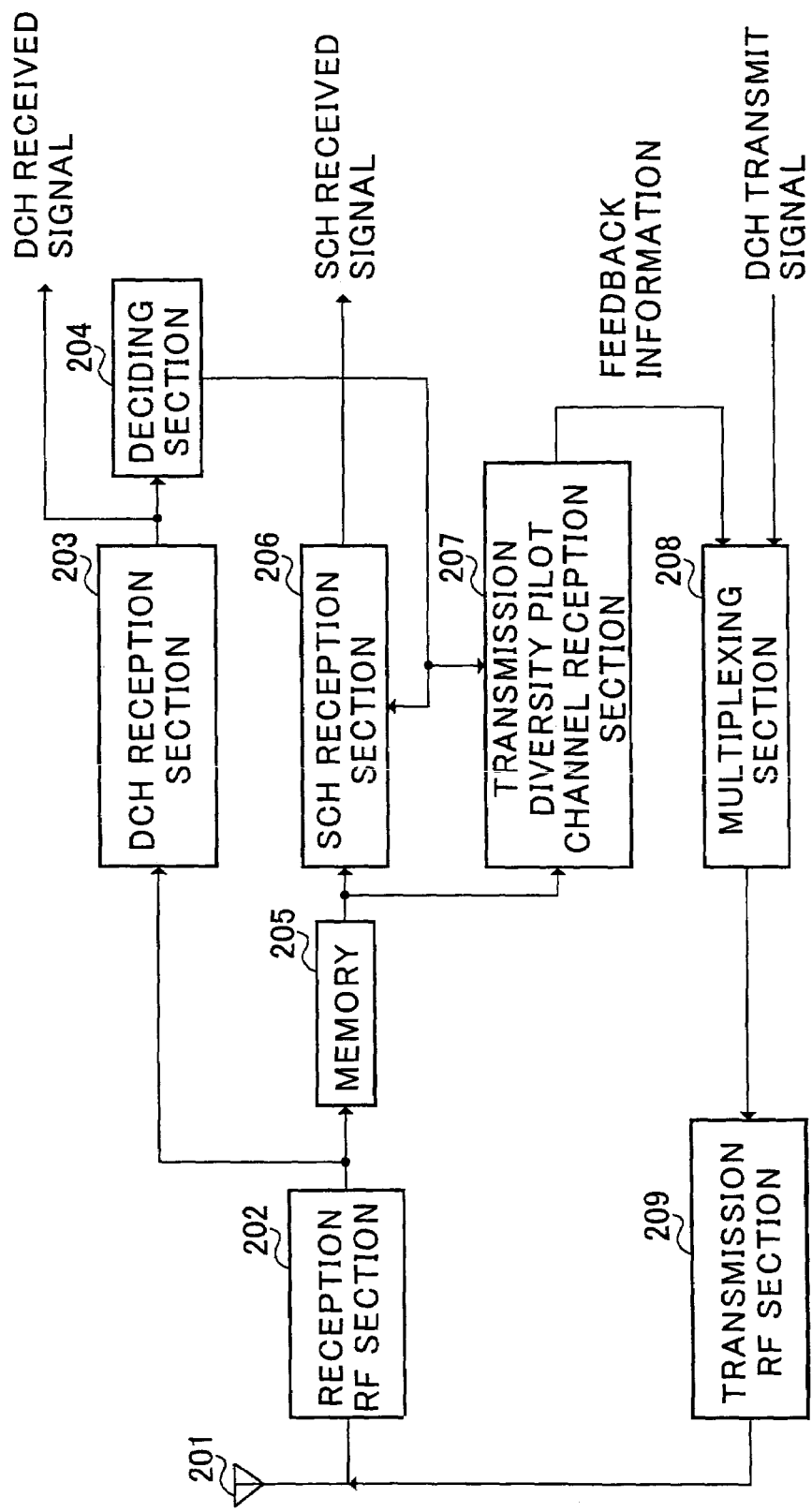
FIG. 2 is a block diagram showing a configuration of a communication terminal apparatus that performs wireless communication with the wireless base station apparatus shown in FIG. 1.

FIG. 2 is a block diagram showing a configuration of a communication terminal apparatus that performs wireless communication with the wireless base station apparatus shown in FIG. 1.

The downlink channel signal (received signal) transmitted from the wireless base station apparatus is received in reception RF section via antenna 201. In reception RF section 202, the received signal is subjected to predetermined reception processing (down conversion, amplification, A/D conversion, etc.), and the signal after the wireless reception processing is output to DCH reception section 203. The signal after the wireless reception processing is stored also in-memory 205.

In DCH reception section 203, the signal after the wireless reception processing is subjected to dispreading processing by the spreading code used in the wireless base station apparatus, and demodulation processing with the signal after the dispreading processing takes place to obtain destination information and transmission rate information transmitted by the dedicated channel. Destination information and transmission rate information are then output to deciding section 204.

Deciding section 204 makes decisions as to whether the destination information addresses the terminal, and, when it does, interprets and outputs the transmission rate to shared channel reception section 206 and to transmission diversity pilot channel reception section 207.

In shared channel reception section 206, the signal stored in memory 205 is subjected to modulation processing using the transmission rate interpreted in deciding section 204, and, after decoding a shared channel, received signal is obtained.

In transmission diversity pilot channel reception section 207, on the other hand, feedback information for transmission diversity is generated by using the known signals for transmission diversity from among the signals stored in memory 205 at the transmission rate interpreted in deciding section 204. This feedback information is output to multiplexing section 208.

Multiplexing section 208 multiplexes feedback information and transmission signals of an dedicated channel and transmits the result to transmission RF section 209 when DSCH addresses the terminal apparatus. In transmission RF section 209, predetermined wireless reception processing (D/A conversion, amplification, up-conversion, etc.) for the multiplexed signal takes place. The signal after the wireless transmission processing is transmitted as an uplink channel signal to a wireless base station apparatus via antenna 201.

Next a case will be described here where a wireless communication method according to the present embodiment is performed with a wireless base station apparatus and communication terminal apparatus of the above configurations. A case will be described here where user (a) is selected as a user to receive DSCH-transmitted signals.

To begin with, in this context, user (a) is determined to be the object of DSCH assignment in the wireless resource management section. The wireless base station apparatus transmits this user assignment information (destination information) and transmission rate information to the communication terminal apparatus using user (a)'s dedicated channel, whereupon an S-CPICH (transmission diversity pilot-channel) signal is also transmitted to the communication terminal apparatus.

User (a)'s communication terminal apparatus receives the downlink channel signal from the wireless base station apparatus, modulates the dedicated channel signal appended to DSCH in DCH reception section 203, confirms that DSCH addresses the communication apparatus in deciding section 204, and interprets the transmission rate. Then, S-CPICH is received in transmission diversity pilot channel reception section 207 at the above transmission rate, and feedback information for transmission diversity is generated by using the known signals with this S-CPICH. This feedback information is then transmitted on an uplink channel to the wireless base station apparatus.

The base station apparatus receives the uplink channel signal and obtains the received signal in user (a)'s received signal processing section 103 and outputs the feedback information contained in the received signal to feedback information selection section 106. In accordance with the feedback information from user (a)'s communication terminal apparatus, feedback information selection section 106 then outputs a weight for transmission diversity that corresponds to user (a) to diversity multiplication section 112a and 112b.

User assignment information determined in the wireless resource management section is sent to SCH assignment section 107. SCH assignment section 107 controls in a way that user (a)'s dedicated channel (DCH) data (destination information, transmission rate information, etc.) that is transmitted by DSCH is output to adder 109 and 110, while user (b)'s and user (c)'s dedicated channel (DCH) data that are not transmitted by DSCH are output to adder 108.

In adder 109 and 110, DSCH, user (a)'s dedicated channel (DCH), and S-CPICH that are transmitted from antenna 101a are respectively multiplexed. The signal multiplexed in adder 109 is output to diversity multiplication section 112a and there multiplied by the weight obtained based on feedback information from user (a). Moreover, the signal multiplexed in adder 110 is output to diversity multiplication section 112b and there multiplied by the weight obtained based on feedback information from user (a).

The signal multiplied by a weight for transmission diversity is output to directivity multiplication section 113a and 113b respectively and there multiplied by a transmission weight for user (a). The transmission weight used here is one obtained in the AAA reception section that corresponds to user (a)'s received signal processing section 103 based on a received signal's direction of arrival.

The signal multiplied by a transmission weight is respectively transmitted from antenna 101a and 101b as a downlink channel signal via transmission RF section 115a and 115b. From one antenna element of antenna 101a, signals for dedicated channels (DCH) that are not transmitted by DSCH are transmitted with user (a)'s signal that is multiplied by up to a transmission weight.

User (a)'s communication terminal apparatus receives the downlink channel signal from the wireless base station apparatus, modulates the dedicated channel (DCH) signal appended to DSCH in DCH reception section 203, confirms that DSCH addresses the communication apparatus in deciding section 204, and interprets the transmission rate. DSCH signals are then received at this transmission rate.

Thus transmission diversity and AAA transmission are applied with respect to a user's (user (a)) dedicated channel (DCH) that is transmitted by DSCH dedicated channel (DCH), and the dedicated channels (DCH) for users (user (b), user (c)) that are not transmitted by DSCH are transmitted without the application of transmission diversity.

Figure 3:
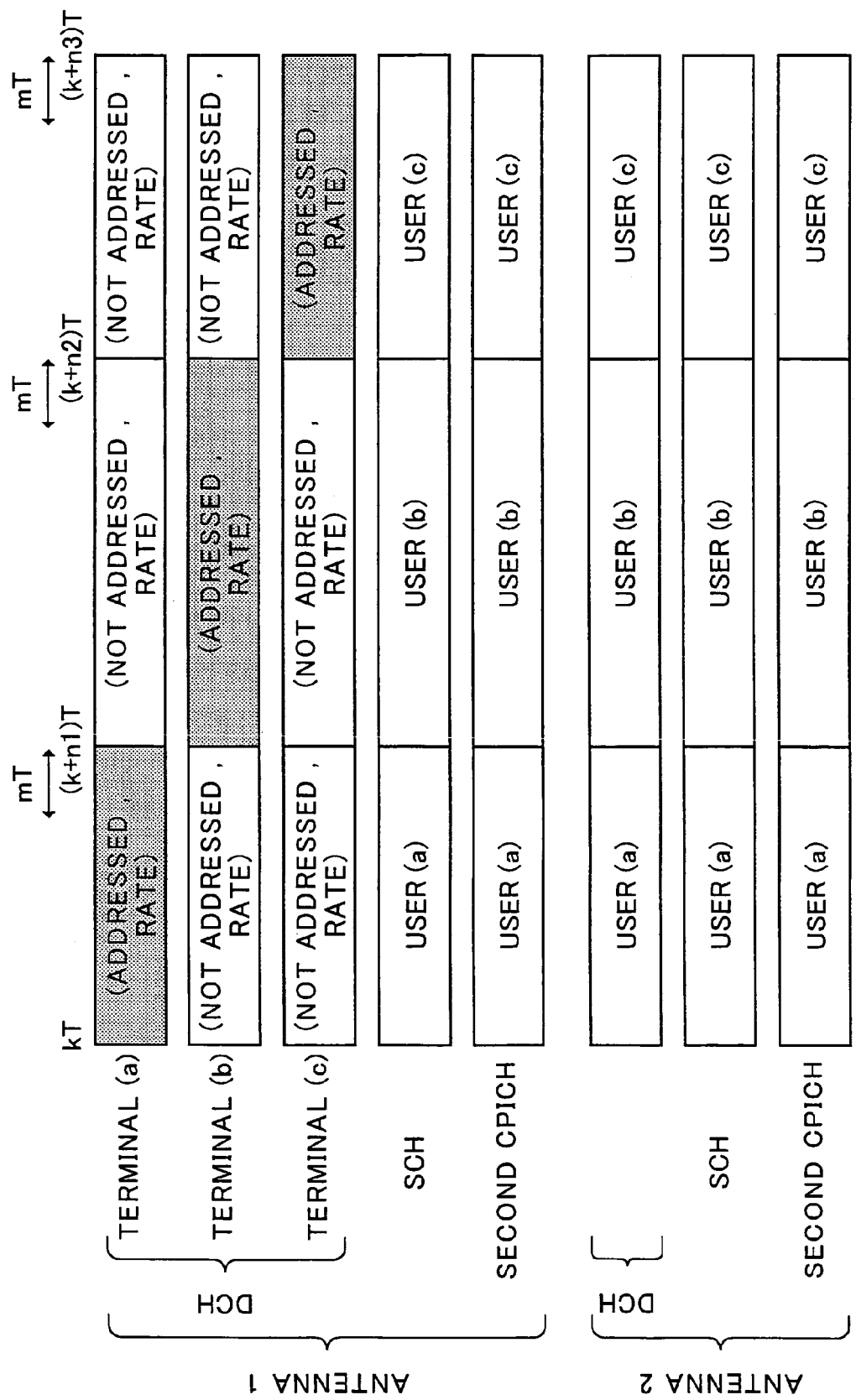
FIG. 3 is a drawing illustrating the timing of transmission in the wireless base station apparatus shown in FIG. 1.

The timing user (a) through user (c) share DSCH to perform transmission will be described with FIG. 3. FIG. 3 is a drawing showing the timing of transmission in the wireless base station apparatus shown in FIG. 1.

In this context, from time kT user (a) is assigned DSCH, from time (k+n1)T user (b) is assigned DSCH, and from time (k+n2)T user (c) is assigned DSCH.

Figure 4A:
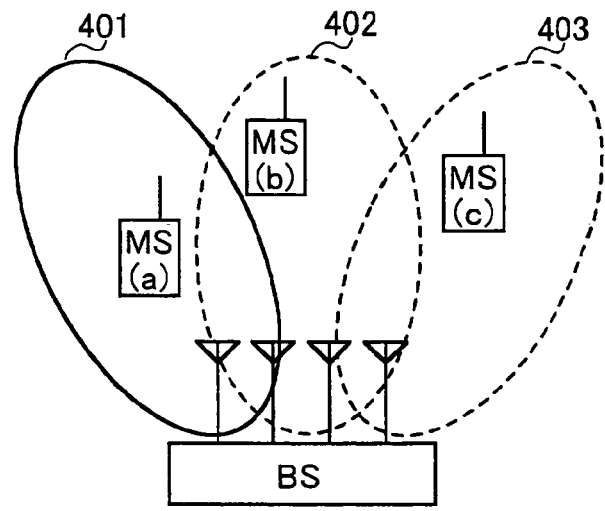
FIG. 4A is a drawing illustrating the shifting of pilot channel directivity.

From time kT to time (k+n1)T, user (a) is assigned DSCH, and accordingly destination information and transmission rate information are transmitted to user (a) using an dedicated channel (DCH), whereupon transmission diversity and AAA transmission are applied to user (a)'s dedicated channel (DCH), DSCH, and to S-CPICH. As for AAA transmission, as shown in FIG. 4A, directivity 401 in respect to user (a) is used. In contrast, user (b) and user (c) are not assigned DSCH, and so their dedicated channels, DSCH, and S-CPICH are transmitted using one antenna without the application of transmission diversity.

Figure 4B:
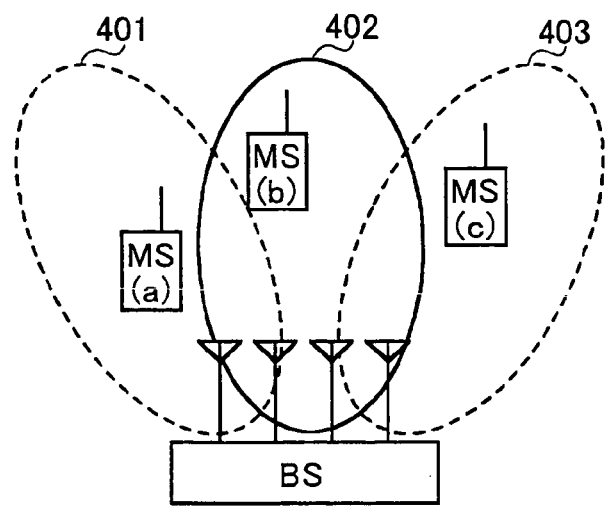
FIG. 4B is a drawing illustrating the shifting of pilot channel directivity.

From time (k+n1)T to time (k+n2)T, user (b) is assigned DSCH, and accordingly destination information and transmission rate information are transmitted to user (b) using an dedicated channel, whereupon transmission diversity and AAA transmission are applied to user (b)'s dedicated channel, DSCH, and to S-CPICH. As for AAA transmission, as shown in FIG. 4B, directivity 402 in respect to user (b) is used. In contrast, user (a) and user (c) are not assigned DSCH, and so their dedicated channels, DSCH, and S-CPICH are transmitted using one antenna without the application of transmission diversity.

Figure 4C:
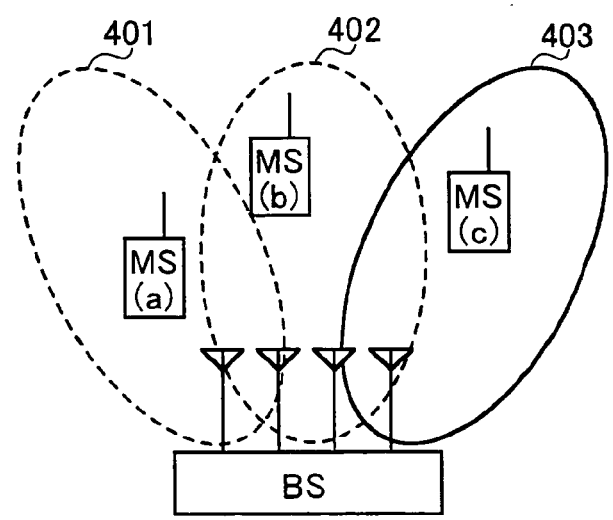
FIG. 4C is a drawing illustrating the shifting of pilot channel directivity.

From time (k+n2)T to time (k+n3)T, user (c) is assigned DSCH, and accordingly destination information and transmission rate information are transmitted to user (c) using an dedicated channel, whereupon transmission diversity and AAA transmission are applied to user (c)'s dedicated channel, DSCH, and to S-CPICH. As for AAA transmission, as shown in FIG. 4C, directivity 403 in respect to user (c) is used. In contrast, user (a) and user (b) are not assigned DSCH, and so their dedicated channels, DSCH, and S-CPICH are transmitted using one antenna without the application of transmission diversity.

As described above, each user's communication terminal apparatus obtains destination information and transmission rate information in the shaded section in its dedicated channel (DCH) as shown in FIG. 3, interprets the destination, interprets transmission rate information when the communication terminal is the destination, and receives DSCH signal by this transmission rate.

By thus applying transmission diversity only with respect to an dedicated channel of a user to which DSCH is assigned, there is no need to assign pilot cannels to users to which DSCH is not assigned. This makes it possible to solve code resource shortages resulting from the growth of pilot channels in number.

There are cases where an dedicated channel appended to DSCH transmits control information alone as well as cases where this dedicated channel transmits sound and data and the like with control information. When control information alone is transmitted, the data volume is extremely low. So other users suffer little interference, and there is no need to reduce the transmission power of communication terminals by means of AAA reception. As a result, it is possible to reduce AAA processing load by applying AAA reception only with respect to received signals from a user DSCH is assigned to.

Figure 5:
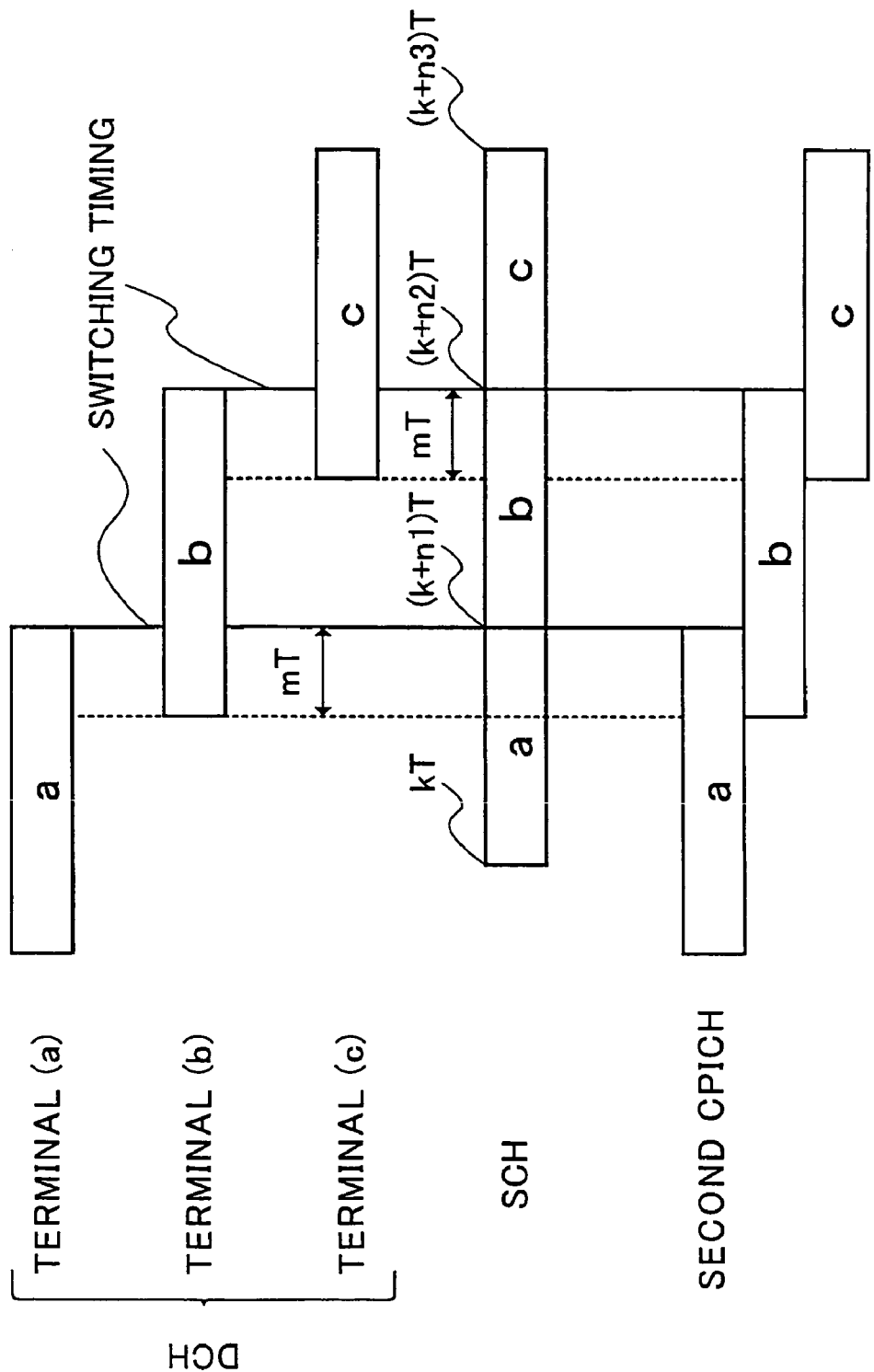
FIG. 5 is a drawing illustrating the details of the timing of transmission in the wireless base station apparatus shown in FIG. 1.

In the above description, the wireless base station apparatus receives signals from all users by means of AAA reception. However, a case will be described below with FIG. 5 where AAA reception is applied only to received signals from a user to which DSCH is assigned. In this context, in the wireless base station apparatus, the AAA reception section is switched for a DSCH-assigned user and then assigned, and AAA reception starts early enough to make the weight calculation for AAA transmission certainly possible.

Assuming that from time kT user (a) is assigned DSCH, from time (k+n1)T user (b) is assigned DSCH, and from time (k+n2)T user (c) is assigned DSCH, and that the time to calculate transmission weight for AAA transmission is mT, the AAA reception section is assigned as follows:

Time kT~time (k+n1−m)T: user (a)

Time (k+n1−m)T~time(k+n1)T: user (a) and user (b)

Time (k+n1)T~time(k+n2−m)T: user (b)

Time (k+n2−m)T~time(k+n2)T: user (b) and user (c)

Time (k+n2)T~time (k+n3)T: user (c).

By thus assigning AAA reception sections according to DSCH assignments, it suffices to provide AAA reception sections only where reception preparation time mT for AAA reception and the time intervals (n1, n2, n3, . . . ) in user assignments overlap. In this example, it suffices to provide two AAA reception sections for three users.

Generally, since the number of users assigned to DSCH is large and varies from dozens up to approximately one hundred, by reducing the number of AAA reception sections, it is possible to make hard configurations smaller and to reduce the processing load substantially.

EMBODIMENT 2

A case will be described here with this embodiment where transmission diversity is not performed and code resource shortages due to the growth of pilot channels in number are avoided by means of sharing a pilot channel and by switching the directivity of the pilot channel according to the switching of a shared channel.

Figure 6:
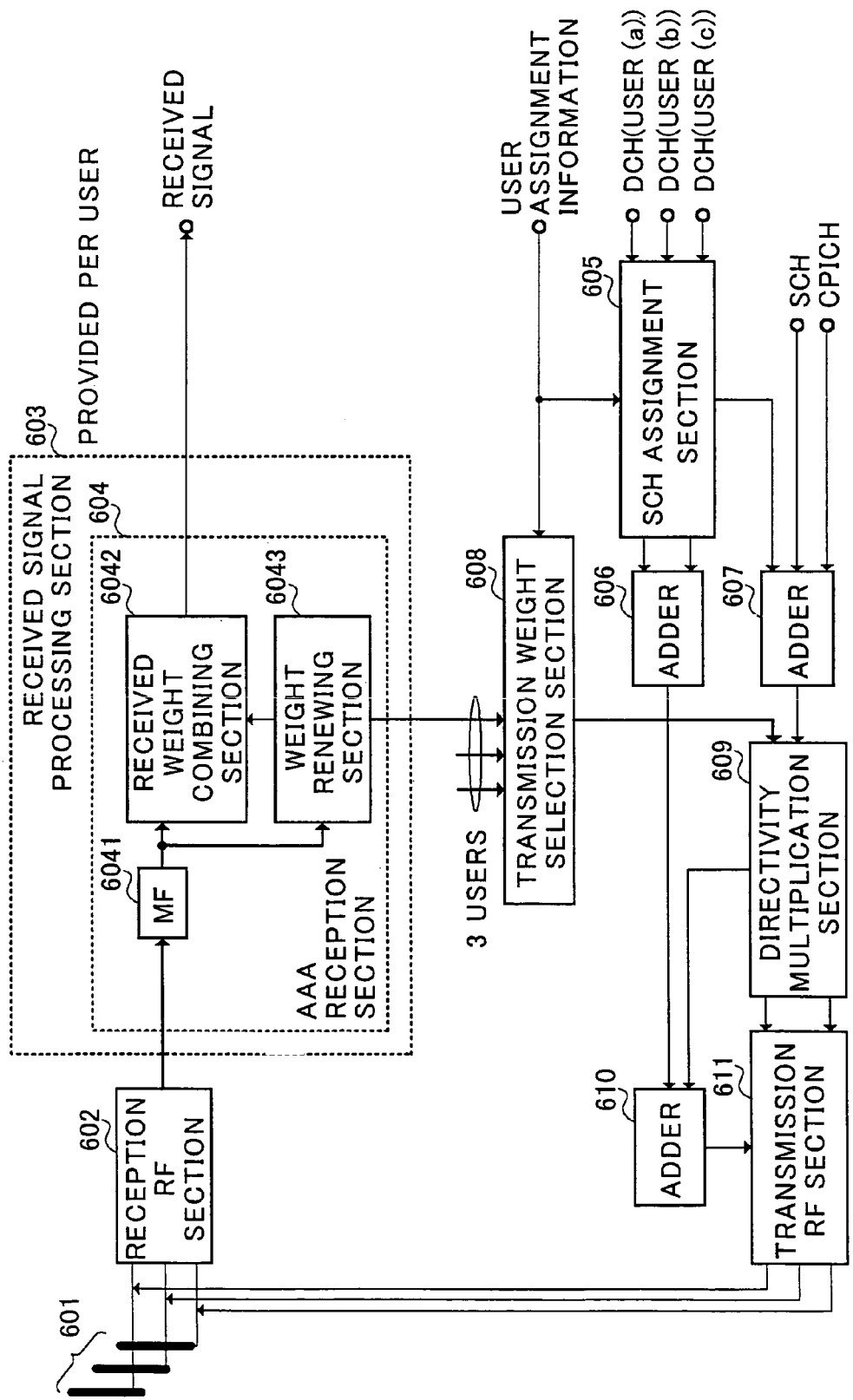
FIG. 6 is a block diagram showing a configuration of a wireless base station apparatus according to Embodiment 2 of the present invention.

FIG. 6 is a block diagram showing a configuration of a wireless base station apparatus according to Embodiment 2 of the present invention. The bold lines in FIG. 6 denote information for 3 antenna elements.

A case will be described here with FIG. 6 where 3 antenna elements constitute an array antenna. However, the present invention is not limited to such case and is applicable to cases where an array antenna comprises any number of antenna elements other than 3. Also, the present embodiment describes a case with 3 users, yet the present invention can similarly be applied to cases with 2 users or 4 or more users. The present embodiment furthermore describes a case where DSCH is used as a shared channel (SCH) and S-CPICH as a common pilot channel (CPICH).

An uplink channel signal (received signal) from a communication terminal apparatus is received in reception RF section 602 via antenna 601. In reception RF section 602, the received signal is subjected to predetermined wireless reception processing (i.e., down-conversion, amplification, A/D conversion, etc.), and the signal after the wireless reception processing is output to received signal processing section 603.

Received signal processing section 603 is provided per user, and each one comprises AAA reception section 604. Furthermore, AAA reception section 604 each comprises matched filter (MF) 6041, received weight combining section 6042, and weight renewing section 6043.

The signal output from reception RF section 602 is subjected to correlation calculation in MF 6041 in AAA reception section 604 using the spreading code used by the communication terminal. The output of this correlation calculation is sent to received weight combining section 6042 and to weight renewing section 6043.

In weight renewing section 6043, a direction of arrival of the received signal (user) is estimated, and the received weight is calculated based on the result of this arrival direction estimation. The received weight is then output to received weight combining section 6042. The received weight is also output from weight renewing section 6043 to transmission weight selection section 608 to be used as a transmission weight in transmission weight selection section 608.

In received weight combining section 6042, AAA reception processing upon the correlation output from MF 6041 takes place using the received weight obtained in weight renewing section 6043 to obtain the received signal.

In SCH assignment section 605, a user's dedicated channel (DCH) that is to be transmitted by DSCH is selected based on user assignment information. Since transmission diversity and AAA transmission are applied to the transmission data (e.g., destination and transmission rate) of the user's dedicated channel (DCH) transmitted by DSCH along with DSCH and S-CPICH, the transmission data of the DSCH-transmitted user's dedicated channel is multiplexed with DSCH and S-CPIH in adder 607 and then output to directivity multiplication section 609.

The user assignment information is also output to transmission weight selection section 608, and accordingly, transmission weight selection section 608 selects a transmission weight for user to receive DSCH-transmitted signals. The selected transmission weight is output to directivity multiplication section 609.

In directivity multiplication section 609, the output from adder 607 is multiplied by the transmission weight selected in transmission weight selection section 608, and the signal after the multiplication is output to transmission RF section 611 respectively. Incidentally, output for one antenna element of antenna 601 is sent to directivity multiplication section 609.

Meanwhile the transmission data (destination, transmission rate) of user dedicated channels (DCH) that are not transmitted by DSCH are multiplexed in adder 606 and output to adder 610. In adder 610, the output from directivity multiplication section 609 and the transmission data of user dedicated channels that are not transmitted by DSCH are multiplexed and output to transmission RF section 611.

In transmission RF section 611, outputs from directivity multiplication section 609 and from adder 610 are subjected to predetermined wireless transmission processing (D/A conversion, amplification, up-conversion, etc.). The signal after the wireless transmission processing is transmitted as a downlink channel signal via antenna 601 to communication terminal apparatus.

At this point, transmission diversity and AAA transmission are applied to transmit the DSCH-transmitted user's dedicated channel (DCH), DSCH, and S-CPICH from antenna 601, and the transmission of user dedicated channels that are not transmitted by DSCH is performed by one antenna element of antenna 601.

Next a case will be described here where a wireless communication method according to the present embodiment is implemented using a wireless base station apparatus of the above configuration and communication terminal apparatus shown in FIG. 2. A case will be described here where user (a) is selected as a user to transmit DSCH to.

User assignment information determined in the wireless resource management section is sent to SCH assignment section 605. SCH assignment section 605 controls such that user (a)'s dedicated channel (DCH) data (destination information, transmission rate information, etc.) that is transmitted by DSCH is output to adder 607 while user (b)'s and user (c)'s dedicated channel (DCH) data that are not transmitted by DSCH are output to adder 606.

In adder 607, DSCH, user (a)'s dedicated channel (DCH), and S-CPICH that are transmitted from antenna 601 are multiplexed. The signal multiplexed in adder 607 is output to directivity multiplication section 609 and there multiplied by a transmission weight that corresponds to user (a). The transmission weight used here is one obtained in the AAA reception section in user (a)'s received signal processing section 603 based on a received signal's direction of arrival.

The signal multiplied by transmission weight is transmitted as a downlink channel signal from antenna 601 via transmission RF section 611. Incidentally, from one antenna element of antenna 601, signals for dedicated channels (DCH) that are not transmitted by DSCH are transmitted with user (a)'s signal that is multiplied by up to a transmission weight.

User (a)'s communication terminal apparatus receives the downlink channel signal from the wireless base station apparatus, modulates the dedicated channel (DCH) signal appended to DSCH in DCH reception section 203, confirms that DSCH addresses the communication apparatus in deciding section 204, and interprets the transmission rate. DSCH signals are then received at this transmission rate.

Figure 7:
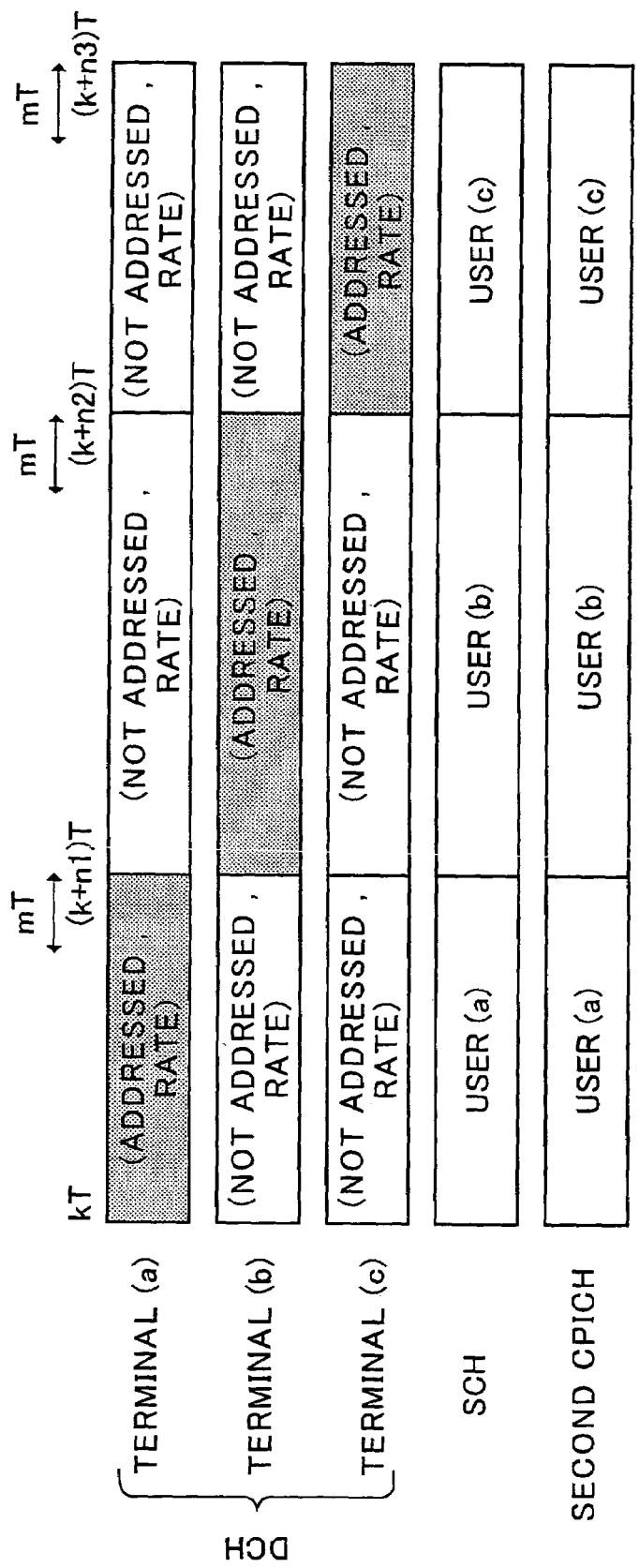
FIG. 7 is a drawing illustrating the timing of transmission in the wireless base station apparatus shown in FIG. 6.

The timing user (a) through user (c) share DSCH to perform transmission will be described with FIG. 7. FIG. 7 is a drawing showing the timing of transmission in the wireless base station apparatus shown in FIG. 6.

In this context, from time kT user (a) is assigned DSCH, from time (k+n1)T user (b) is assigned DSCH, and from time (k+n2)T user (c) is assigned DSCH.

From time kT to time (k+n1)T, user (a) is assigned DSCH, and accordingly destination information and transmission rate information are transmitted to user (a) using an dedicated channel, whereupon AAA transmission is applied to user (a)'s dedicated channel (DCH), DSCH, and to S-CPICH. As for AAA transmission, as shown in FIG. 4A, directivity 401 in respect to user (a) is used.

From time (k+n1)T to time (k+n2)T, user (b) is assigned DSCH, and accordingly destination information and transmission rate information are transmitted to user (b) using an dedicated channel, whereupon AAA transmission are applied to user (b)'s dedicated channel, DSCH, and to S-CPICH. As for AAA transmission, as shown in FIG. 4B, directivity 402 in respect to user (b) is used.

From time (k+n2)T to time (k+n3)T, user (c) is assigned DSCH, and accordingly destination information and transmission rate information are transmitted to user (c) using an dedicated channel, whereupon transmission diversity and AAA transmission are applied to user (c)'s dedicated channel, DSCH, and to S-CPICH. As for AAA transmission, as shown in FIG. 4C, directivity 403 in respect to user (c) is used.

As described above, each user's communication terminal apparatus obtains destination information and transmission rate information in the shaded section in its dedicated channel as shown in FIG. 7, interprets the destination, interprets transmission rate information when the communication terminal is the destination, and receives DSCH signal at this transmission rate.

By thus sharing a pilot channel as well and by switching the directivity of the pilot channel according to the switching of a shared channel, it is possible to avoid code resource shortages due to the growth of pilot channels in number.

With the present embodiment too, similar to Embodiment 1, it is possible to reduce the number of AAA reception sections and to make hard configurations small to reduce the processing load substantially by way of assigning AAA reception sections to users in accordance with DSCH assignment.

The present invention is not limited to above Embodiment 1 and 2 and can be implemented in various modified forms. For instance, although Embodiment 1 and 2 describe cases where a wireless base station apparatus uses a received weight obtained from a received signal's direction of arrival as a transmission weight, the present invention is not limited to such case and applicable to cases where a transmission weight is obtained anew from a received signal's direction of arrival and this weight is applied upon performing AAA transmission.

Furthermore, although Embodiment 1 and 2 describe cases where DSCH is used as a shared channel and S-CPICH as a pilot channel, the present invention is not limited to such case, and a channel other than DSCH may be used for a shared channel as long as it is a channel for common use by a plurality of users, and a channel other than S-CPICH may be used as a pilot channel as long as it is a channel capable of directivity transmission and capable of transmitting known signals.

Further still although Embodiment 1 and Embodiment 2 describe cases where dedicated channels for users that are not assigned to a shared channel are transmitted from one antenna, the present invention can apply AAA transmission to dedicated channels for users that are not assigned to a shared channel. In such case, for instance, the output after the multiplexing of dedicated channels for users that are not assigned to a shared channel are to which a directivity transmission weight is multiplied.

The wireless base station apparatus and wireless communication methods under the present invention enable it to secure a large number of users without incurring code resource shortages by for instance performing transmission diversity and adaptive array antenna transmission to users that are assigned shared channel and by sharing a pilot channel like a shared channel.

This application is based on Japanese Patent Application No. 2000-389473 filed on Dec. 21, 2000, entire content of which is expressly incorporated by reference herein.

INDUSTRIAL APPLICABILITY

The present invention is suitable for use with digital wireless communication systems, and more particularly, for use with wireless base station apparatus and wireless communication methods for use with CDMA (Code Division Multiple Access).

The invention claimed is:

1. A wireless transmission apparatus comprising:
   a multiplexer that assigns a dedicated pilot channel (S-CPICH) to the plurality of users as the shared channel used by said plurality of users switches between said plurality of users, and multiplexes a signal of the shared channel and a signal of the pilot channel of only the user to which the shared channel is assigned; and
   a transmit diversity controller that transmits the multiplex signal created in the multiplexer to the user to which the shared channel is assigned, with transmit diversity utilizing a diversity antenna.

2. The wireless transmission apparatus of claim 1, further comprising:
   a calculator that calculates a weight for use for transmit diversity; and
   a weighter that weights the multiplex signal created in the multiplexer applying the weight calculated in the calculator and supplies the weighted signal to the diversity antenna, wherein
   the transmit diversity controller transmits the weighted signal to the user to which the shared channel is assigned with transmit diversity.

3. The wireless transmission apparatus of claim 2, wherein the calculator calculates the weight for use for transmit diversity utilizing feedback information created by a communication terminal based on a known signal.

4. The wireless transmission apparatus of claim 3, wherein the feedback information comprises at least one of phase information and phase and amplitude information.

5. A wireless transmission apparatus comprising:
   a diversity antenna;
   a multiplexer that assigns a dedicated pilot channel (S-CPICH) to a plurality of users as a shared channel used by said plurality of users switches between said plurality of users, and multiplexes a signal of the shared channel, a signal of an appended channel for a user to which the shared channel is assigned, and a signal of the pilot channel of only the user to which the shared channel is assigned;
   a calculator that calculates a weight for use for transmit diversity;
   a weighter that weights the multiplex signal created in the multiplexor applying the weight calculated in the calculator and supplies the weighted signal to the diversity antenna; and
   a transmit diversity controller that transmits the weighted signal to the user to which the shared channel is assigned with transmit diversity and transmits signals of appended channels for users to which the shared channel is not assigned from one antenna.

6. The wireless transmission apparatus of claim 5, wherein the calculator calculates the weight for use for transmit diversity based on an uplink signal from a communication terminal.

7. A wireless transmission method comprising:
   (I) assigning a dedicated pilot channel (S-CPICH) to a plurality of users as a shared channel used by said plurality of users switches between said plurality of users, and multiplexing a signal of the shared channel and a signal of the pilot channel of only a user to which the shared channel is assigned; and
   (ii) transmitting the multiplex signal created in step (I) to the user to which the shared channel is assigned, with transmit diversity utilizing a diversity antenna.

8. A wireless transmission method comprising the steps of:
   (I) assigning a dedicated pilot channel (S-CPICH) to a plurality of users as a shared channel used by said plurality of users switches between said plurality of users, and multiplexing a signal of the shared channel, a signal of an appended channel for a user to which the shared channel is assigned, and a signal of the pilot channel of only the user to which the shared channel is assigned;

(ii) calculating a weight for use for transmit diversity;

(iii) weighting the multiplex signal created in the multiplexer applying the weight calculated in step (I) and supplying the weighted signal to a diversity antenna; and (iv) transmitting the weighted signal to the user to which the shared channel is assigned with transmit diversity and transmitting signals of appended channels for users to which the shared channel is not assigned from one antenna.

* * * * *

UNITED STATES PATENT AND TRADEMARK OFFICE
CERTIFICATE OF CORRECTION

| | | |
|---|---|---|
| PATENT NO. | : 7,392,019 B2 | Page 1 of 1 |
| APPLICATION NO. | : 11/053837 | |
| DATED | : June 24, 2008 | |
| INVENTOR(S) | : Katsuhiko Hiramatsu et al. | |

It is certified that error appears in the above-identified patent and that said Letters Patent is hereby corrected as shown below:

On the title page: item (63) for the related U.S. Application Data reads:

Related U.S. Patent Application Data

(63) Continuation of application No. 10/181,976, filed on July 24, 2002, now Pat. No. 6,876,870.

and should read:

Related U.S. Patent Application Data

(63) Continuation of application No. 10/181,976, filed as application No. PCT/JP01/11118 on December 19, 2001, now Pat. No. 6,876,870.

On the title page: Item (30) for the Foreign Application Priority Data reads:

Dec. 21, 2000   (JP) ............................... 2000/389473
Dec. 19, 2001   (WO) .............................. PCT/JP01/11118 and should read:

Dec. 21, 2000   (JP) ............................... 2000/389473

Signed and Sealed this
Eleventh Day of January, 2011

David J. Kappos
*Director of the United States Patent and Trademark Office*